Patented Oct. 22, 1940

2,218,787

UNITED STATES PATENT OFFICE 2,218,787

HERBICIDE

Thomas F. Catchings, New Orleans, La., Lamar J. Padget, Gulfport, Miss., and Lynn H. Dawsey, Takoma Park, Md.; dedicated to the free use of the People in the territory of the United States No Drawing. Application March 26, 1940, Serial No. 325,988

2 Claims. (Cl. 167—45)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

We hereby dedicate the invention herein described to the free use of the People in the territory of the United States to take effect on the granting of a patent to us.

It is an object of our invention to provide a herbicide adaptable in the destruction of the plant food consumed by insects, such as, for example, the White Fringe beetle which infests known areas in the South.

Our invention embodies a novel utilization of the three elements, viz.: soluble arsenic, oil, and wetting agent. We have discovered that a very high degree of herbicidal effectiveness may be obtained with small amounts of arsenic provided certain proportions of oil and wetting agent are added to the mixture.

The unexpected result found consists of high herbicidal effectiveness produced. It is because of the high effectiveness that material reductions are possible over previously used arsenic or oil when used separately. It will be understood that the high herbicidal effectiveness is due to the interaction of the oil plus arsenic upon the vegetation which give the desirable result.

Sodium arsenite, perhaps, has proven the most effective and practical of all known weed killers. Its use in the past, however, has frequently led to poisoning of likestock which have been permitted to graze upon treated vegetation. Another disadvantage has been the corrosive action of sodium arsenite upon the skin of the workmen engaged in handling it.

It is the primary object of this invention to provide a spray mixture which overcomes these two disadvantages to a very large extent. Our spray contains arsenic, yet we have been able to make important reductions in its concentration. We have found that the arsenic content may be greatly reduced in known weed killing compositions, without actually impairing the herbicidal efficiency, provided certain other ingredients are added. The result is that a spray mixture is formed according to our invention which minimizes the poison hazard to human beings and livestock.

In many instances weed killers are applied for the purpose of destroying all forms of plant life. Typical areas are tennis courts, driveways, and railroad beds. In other instances, however, complete sterilization of the soil is undesirable. Typical areas of the latter type are pastures, wooded hillsides subject to erosion, and farm lands. Also in entomological control work, to which the present invention is especially adaptable, temporary destruction of host plants and vegetation affording food for certain insects may be desirable, without sterilization of the soil.

In the description and claims which follow, the term "soluble arsenic" is meant to include the products formed upon dissolving white or grey arsenic (As$_2$O$_3$) in the presence of an alkali metal hydroxide; such a term is held to also include acidified solutions of such products. The term "oil" is meant to include any natural or processed oil of mineral origin falling within the following specifications:

Flash point (Pensky-Martin, closed cup)—not less than 150° F.

Viscosity (Saybolt-Universal at 100° F.)—50 to 500 seconds.

Volatility (24 hours heating at 100° F.) Dawsey method, Jr. Econ. Ent. 26:735 (1933))—not greater than 25 percent.

Unsulphonatable residue—the smaller the percentage the more suitable the oil.

Examples of suitable oils falling within these specifications are Diesel oil, Industrial Medium Fuel oil, and the Bunker "C" oils. The term "wetting agent" is meant to include materials which, when added to a spray mixture, enhance the wetting power of the mixture toward vegetation. Examples of representative wetting agents applicable in the invention are sodium oleate, potassium fish oil soap, sodium and ammonium caseinates, gum arabic, or sodium lauryl sulfate.

Of course, we are aware of the fact that oils, such as are specified in U. S. Patent 2,056,121 and U. S. Patent 2,160,929, have already been proposed both in the pure and emulsified forms as herbicides, but we do not claim a substantial toxic action for the oil in our composition. In fact, our work has conclusively proven that the oil, when used in the proportion given below, has no value, when the arsenic is taken out of the spray. We also know that our wetting agents are absolutely valueless alone, or with the oil; yet when we add these supplements to a relatively dilute and previously ineffective sodium arsenite solution, a surprising result is produced. We find that we now have a mixture possessing many times the herbicidal effectiveness of the original arsenite solution. Although we know the oil in our composition exerts a slight activity the final degree of herbicidal effectiveness of our novel composition also far surpasses the additive activity of the arsenic and oil acting together.

In the past, arsenical herbicides have usually been applied in the form of a simple aqueous solution of sodium arsenite at higher concentration than that covered by our invention. It has been the practice to apply concentrations in the range between 0.5 percent and 10.0 percent sodium arsenite. We have found, however, that the incorporation of about 10 percent oil together with about 0.2 percent wetting agent permits the formation of a highly effective herbicide with arsenic concentrations as low as one-tenth of one percent ($As_2O_3$ by weight).

Such reduction in the amount of arsenic greatly diminishes the poison hazard toward workers and livestock.

Another unexpected advantage imparted to the mixture through addition of oil and a wetting agent is that the spray coverage is materially extended. These supplements, therefore, act simultaneously, in combination, in at least two ways; namely, to magnify the herbicidal activity of the arsenic, and also to reduce spraying costs by increasing the area covered by a given volume of liquid.

According to the known art, oil, when used as a weed killer alone, must be applied at the rate of 100 to 300 gallons per acre; thus, very large amounts are necessary to obtain a kill of vegetation. We have found that the use of small amounts of oil; namely, 30 to 50 gallons per acre to be sufficient for our purpose, which, in itself, is quite ineffective.

In our invention, the optimum quantity of arsenic in our spray lies within the range of 0.1 percent to 0.3 percent soluble arsenic, calculated as $As_2O_3$. The proper range of oil content is from 5 percent to 30 percent, by volume. The proper proportion of wetting agent may vary from 0.1 percent to 1.0 percent. With these proportions of ingredients, our spray has been found capable of killing vegetation within one week after application, provided it is applied at the rate of from 300 to 600 gallons per acre, depending upon the density of the vegetation.

As an example of the operation of our invention, we have found the following proportion of ingredients to be one of the best:

| | | |
|---|---|---|
| Water | gallons | 88 |
| Caustic soda | pound | 1 |
| 40% sodium arsenite solution | gallon | 1 |
| Tallöl | pounds | 5 |
| Oil | gallons | 10 |

These proportions give a total spray volume of approximately 100 gallons.

The soluble arsenic in this formula may be replaced by a home-made stock solution made by mixing four (4) parts by weight of arsenic and one (1) part by weight of caustic soda, and adding three (3) parts of water and stirring until dissolved. This has long been known as a simple way of preparing sodium arsenite.

When the arsenic is added in the form of a bought solution, the caustic soda specified in the above formula may be replaced by a similar amount of soda ash, with some reduction in cost and no loss in effectiveness.

The function of tallöl, in the example, is to react with the free alkali in solution resulting in the formation of soap. The crude tallöl which we use is obtained as a by-product in the kraft paper industry and contains approximately 45 percent free fatty acids together with 46 percent rosin acids.

Mixing of the spray is best carried out in the common type of spray machine by adding the ingredients in the amounts and in the order listed above, with agitator running.

While we have found tallöl soap to be the most economical and effective wetting agent, it is by no means the only agent applicable in the invention. We have found the addition of equal amounts of powdered casein to give a desirable composition imparting wetting and spreading properties to the spray mixture in a way similar to tallöl soap.

By reduction in the proportion of water specified above, we have also prepared concentrated stock solutions containing the three essential ingredients.

Having thus described our invention, what we claim for Letters Patent is:

1. An herbicide consisting of from one-tenth to one-half percent by weight of soluble arsenic, calculated as $As_2O_3$, of from five to thirty percent by volume of oil, and of from one-tenth to one percent by weight of wetting agent, all dissolved and emulsified in an aqueous medium.

2. An herbicide consisting of:

| | | |
|---|---|---|
| Water | gallons | 88 |
| Caustic soda | pound | 1 |
| 40% sodium arsenite solution | gallon | 1 |
| Tallöl | pounds | 5 |
| Oil | gallons | 10 | in a total spray volume of approximately 100 gallons.

THOMAS F. CATCHINGS.
LAMAR J. PADGET.
LYNN H. DAWSEY.